United States Patent
Omar

(10) Patent No.: US 8,220,870 B2
(45) Date of Patent: Jul. 17, 2012

(54) REMOTE OPERATED INFANT/CHILD CAR SEAT

(76) Inventor: Melanee Omar, Cresco, IA (US)

( * ) Notice: Subject to any disclaimer, the term of this patent is extended or adjusted under 35 U.S.C. 154(b) by 1529 days.

(21) Appl. No.: 11/095,887

(22) Filed: Mar. 31, 2005

(65) Prior Publication Data

US 2006/0138819 A1   Jun. 29, 2006

Related U.S. Application Data

(60) Provisional application No. 60/639,370, filed on Dec. 27, 2004.

(51) Int. Cl.
 *A47C 31/00* (2006.01)

(52) U.S. Cl. .................... 297/250.1; 297/217.3; 297/468

(58) Field of Classification Search ............... 297/217.3, 297/250.1, 468; 24/603
See application file for complete search history.

(56) References Cited

U.S. PATENT DOCUMENTS

| | | | | |
|---|---|---|---|---|
| 4,413,384 A | * | 11/1983 | Lassche | 24/603 |
| 4,432,119 A | * | 2/1984 | Schwark et al. | 24/603 |
| 4,553,625 A | * | 11/1985 | Tsuge et al. | 180/268 |
| 4,813,745 A | * | 3/1989 | Woody | 297/464 |
| 5,181,765 A | * | 1/1993 | Glover | 297/467 |
| 5,475,366 A | * | 12/1995 | Van Lente et al. | 340/525 |
| 5,581,234 A | * | 12/1996 | Emery et al. | 340/457.1 |
| 5,815,895 A | * | 10/1998 | Carlson et al. | 24/603 |
| 6,050,640 A | * | 4/2000 | Gibson et al. | 297/250.1 |
| 6,126,233 A | * | 10/2000 | Gaetano et al. | 297/217.6 |
| 6,225,889 B1 | * | 5/2001 | Furuta et al. | 340/426.36 |
| 6,362,734 B1 | * | 3/2002 | McQuade et al. | 340/457.1 |
| 6,448,907 B1 | * | 9/2002 | Naclerio | 340/945 |
| 6,696,943 B1 | * | 2/2004 | Elrod et al. | 340/539.1 |
| 6,796,610 B2 | | 9/2004 | Nakagawa et al. | |
| 6,811,216 B2 | | 11/2004 | Sedlack | |
| 6,812,844 B1 | * | 11/2004 | Burgess | 340/573.1 |
| 2003/0151281 A1 | * | 8/2003 | Williams | 297/250.1 |
| 2003/0164631 A1 | * | 9/2003 | Sedlack | 297/250.1 |

OTHER PUBLICATIONS

Dictionary.com, Wordnet® 3.0, Princeton Universtiy, http://dictionary.reference.com/browse/transponder (last visited on Jun. 19, 2007).*
Merriam-Webster Online Dictionary, Merriam-Webster, http://www.merriam-webster.com/dictionary/on (last visited on Feb. 29, 2008).*
Merriam-Webster Online Dictionary, Merriam-Webster, http://www.merriam-webster.com/dictionary/surface (last visited on Feb. 29, 2008).*

* cited by examiner

*Primary Examiner* — David Dunn
(74) *Attorney, Agent, or Firm* — Zarley Law Firm, P.L.C.

(57) ABSTRACT

An infant/child car seat having a shell with a seat belt releasably secured to the shell by a release button, and a transponder that remotely activates the release button to release the seat belt from the shell.

6 Claims, 2 Drawing Sheets

REMOTE OPERATED INFANT/CHILD CAR SEAT

BACKGROUND OF THE INVENTION

This invention relates to child car seats for seating and transporting infants and small children. More specifically, this invention relates to a remote controlled device for unbuckling an infant from a car seat.

Infant/child car seats are commonly used to conveniently and safely seat and transport infants and small children. Such car seats generally comprise a molded plastic seat shell having a seat back for supporting the infant and a U-shaped handle that extends across the seat shell for carrying the seat shell. A safety belt harness is typically provided to secure the infant/child to the seat shell. The safety belt harness is usually secured and releasable by use of a manual release button.

One problem with conventional car seats is that in order to release a child from the car seat an individual must manually press the release button of the safety belt. This becomes a problem because at certain times a parent or babysitter may have their arms full or will have one or more children in the car requiring them to crawl across the seat. Further difficulties arise when one child must be handled and a second child is to be released from the car seat. Therefore there is a need in the art to provide for a remotely operated releasing mechanism for an infant car seat thus allowing for a more convenient method of handling multiple children.

Therefore it is a principal object of the present invention to provide a remotely operated device that will allow for the activation of the release button on an infant car seat to improve upon the state of the art.

SUMMARY OF THE INVENTION

An infant/child car seat having a shell with a seat belt releasably secured to the shell by a release button, and a transponder that remotely activates the release button to release the seat belt from the shell.

DESCRIPTION OF THE PREFERRED EMBODIMENT

Figure 1:
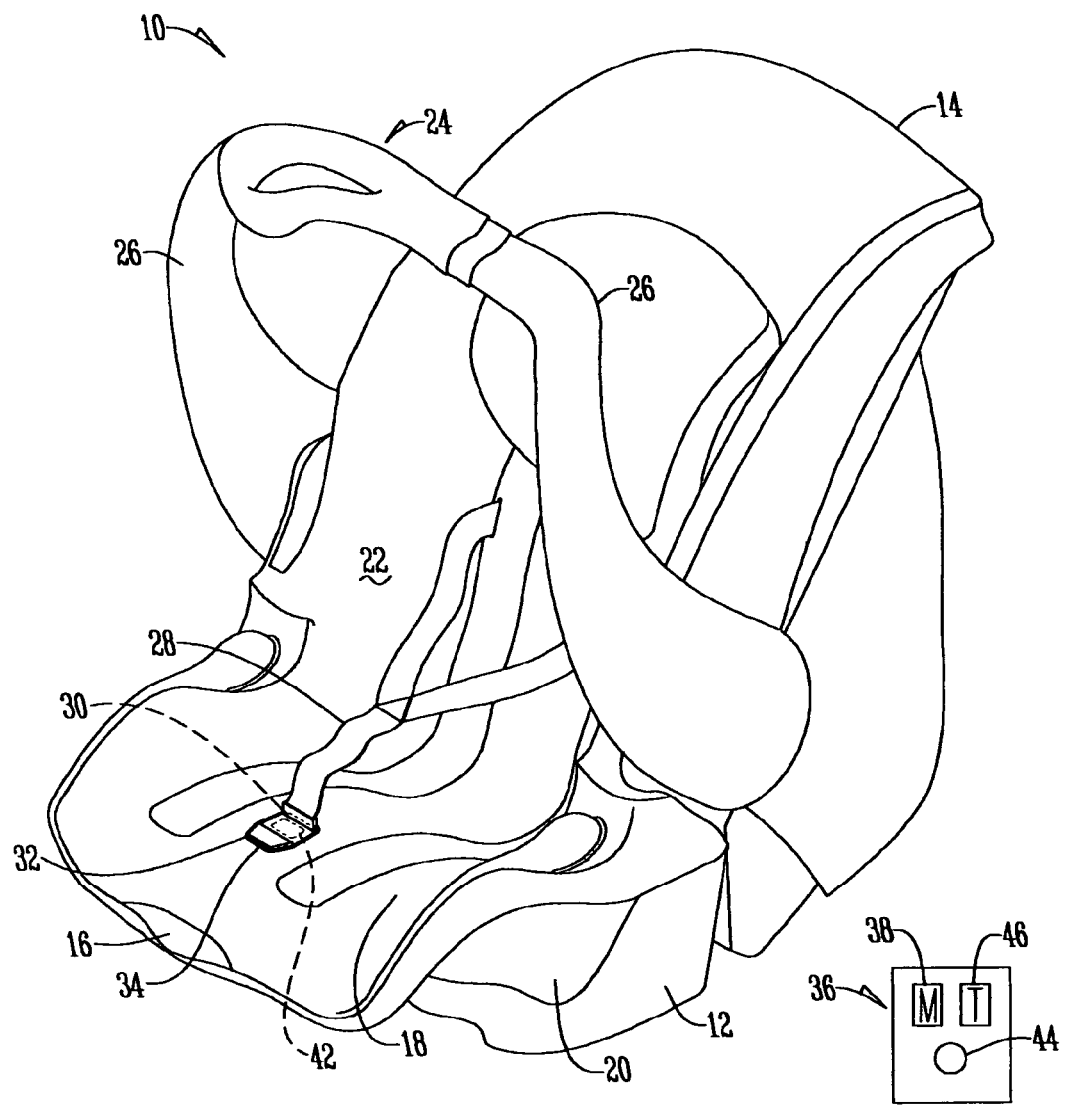
FIG. 1 is a perspective view of an infant/child seat with a remote device.
Figure 2:
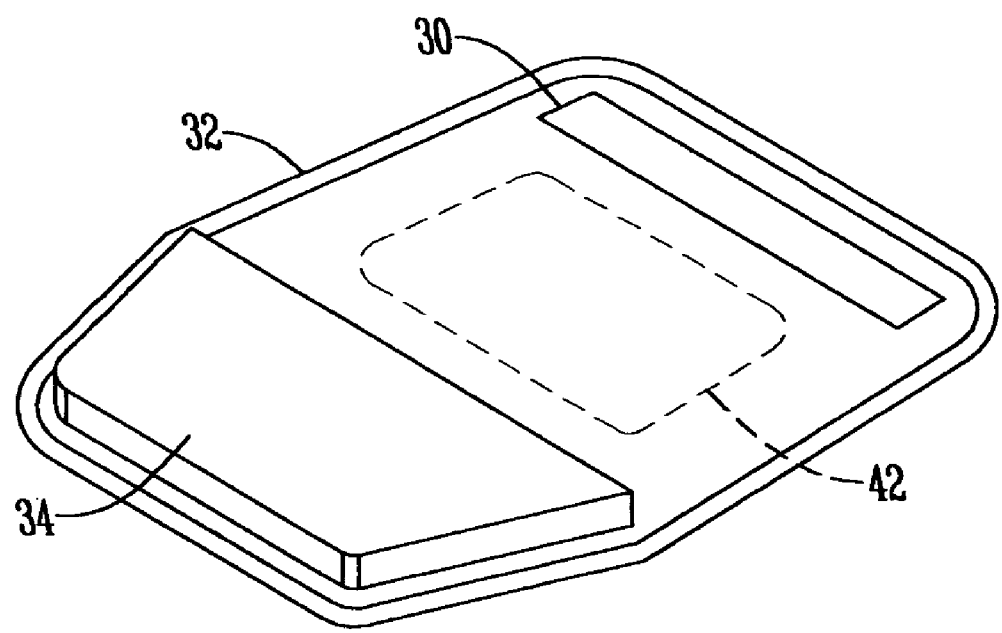
FIG. 2 is an enlarged perspective view of a release button for an infant/child seat.

An infant/child car seat 10 includes a molded plastic seat shell 12 having a head end 14 and a foot end 16. The seat shell 12 includes a seating surface 18 and a pair of sidewalls 20 that extend upwardly from the sides of the seating surface. The seating surface 18 and sidewalls 20 are preferably covered with a removal padding material 22 to comfortably support an infant/child in the seat shell 12. Additionally, the infant car seat 12 has a handle assembly 24 with a pair of handle arms 26 that extend towards the sidewalls of the car seat.

The car seat 10 also has a seat belt 28 or safety belt that may be routed through an opening 30 of a tensioning device 32 provided near the foot end 16 of the seat shell 12 as is well known in the art. When the tensioning device 32 is activated the safety belt 28 can be drawn through the opening 30. When the tensioning device 32 is released, the belt 28 is constrained in the opening 30. Accordingly, by operating the tensioning device 32 the length of the safety belt 28 extending behind the seat shell 12 can be varied. The safety belt 28 is generally held in place as is well known in the art to hold a child within the car seat 10. Traditionally a release button 34 is used to release the safety belt. The present invention envisions the use of a remotely operated release button 34. The remote comprises a transponding device. The transponder 36 has a microprocessor 38 for controlling a transmitter 46, transreceiver 42, and an input device 44. The input device 44 preferably is a button that when pressed sends a signal to a transreceiver associated with the car seat that causes the release button 34 to be actuated to release the child from the safety belt 28.

One skilled in the art will appreciate that the input device 22 of the transponder 36 or remote can be hand-held such as part of a key chain, could be part of the car such as a button on the dashboard of the car, or even a part of the key itself. Additionally, one skilled in the art will appreciate that the transponder can be designed to interact with a plurality of car seats, such that the transponder can control each releasable button individually or in unison. Also, in an alternative embodiment, the remote controlled device is adapted for use with car seats built into a vehicle. Thus, an individual having multiple children within a car may more easily maneuver within the car while handling their children. Therefore at the very least, each of the stated objectives has been met.

I claim:

1. An infant/child car seat comprising:
   a seat shell having a seating surface and a seat belt releasably secured to the shell by a release button on the seating surface;
   a transponder having an input device that remotely activates the release button to release the seat belt from the shell; and
   wherein the input device of the transponder is hand held.

2. The device of claim 1 wherein the transponder has a microprocessor.

3. The device of claim 1 wherein a transreceiver is associated with the release button.

4. The device of claim 1 wherein the input device is part of a key chain.

5. The device of claim 1 wherein the input device is part of a key.

6. The device of claim 3 wherein the input device is a button that when pressed sends a signal to the transceiver to cause the release button to be actuated.

* * * * *